US012556520B1

(12) United States Patent
Ademiluyi et al.

(10) Patent No.: US 12,556,520 B1
(45) Date of Patent: *Feb. 17, 2026

(54) OBSCURING CONNECTIONS BETWEEN SOURCE AND DESTINATION DEVICES VIA A POOL OF DISPOSABLE PROXIES

(71) Applicant: Cyber IP Holdings, LLC, Herndon, VA (US)

(72) Inventors: Walter Adeyinka Ademiluyi, Boyds, MD (US); William Theodore Schoon, Taylors, SC (US); Scott Christian Green, Taylors, SC (US); Carl Bailey Jacobs, Fredericksburg, VA (US); Jeremiah MacDonald, Greenville, SC (US); Christopher Edward Delaney, Front Royal, VA (US); Chava Louis Jurado, Leesburg, VA (US)

(73) Assignee: Cyber IP Holdings, LLC, Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,613

(22) Filed: Oct. 12, 2023

Related U.S. Application Data

(63) Continuation of application No. 17/862,477, filed on Jul. 12, 2022, now Pat. No. 11,824,839, which is a
(Continued)

(51) Int. Cl.
*H04L 9/40* (2022.01)
*H04L 67/141* (2022.01)
*H04L 67/56* (2022.01)

(52) U.S. Cl.
CPC ........ *H04L 63/0421* (2013.01); *H04L 67/141* (2013.01); *H04L 67/56* (2022.05); *H04L 63/08* (2013.01)

(58) Field of Classification Search
CPC ... H04L 63/0421; H04L 63/08; H04L 67/141; H04L 67/56
See application file for complete search history.

(56) References Cited

U.S. PATENT DOCUMENTS

2016/0021260 A1* 1/2016 Varsavsky Waisman-Diamond ............... H04W 16/00 370/338
2016/0345170 A1* 11/2016 Mann .................... G06F 21/602
(Continued)

*Primary Examiner* — Gil H. Lee
(74) *Attorney, Agent, or Firm* — Jones Day

(57) ABSTRACT

A system for obscuring a source IP address of a source network device from a destination network device comprises a proxy manager and first and second disposable network proxies. Credentials for a plurality of disposable network proxies are provided to the source network device. A proxy disposal trigger is generated for each disposable network proxy in the plurality of disposable network proxies based on usage of the disposable network proxy. A connection request comprising the credentials and a destination IP address of the destination network device is received from the source network device. First traffic from the source network device to the destination network device is forwarded over a first connection with the destination network device that uses an IP address of the disposable network proxy. Second traffic from the destination network device to the source network device is forwarded over a second network connection with the source network device.

20 Claims, 5 Drawing Sheets

Related U.S. Application Data continuation of application No. 16/807,253, filed on Mar. 3, 2020, now Pat. No. 11,394,694.

(56) References Cited

U.S. PATENT DOCUMENTS

| | | | |
|---|---|---|---|
| 2017/0272316 A1* | 9/2017 | Johnson | H04L 61/301 |
| 2020/0104050 A1* | 4/2020 | Srinivasan | G06F 3/067 |

* cited by examiner

OBSCURING CONNECTIONS BETWEEN SOURCE AND DESTINATION DEVICES VIA A POOL OF DISPOSABLE PROXIES

CROSS-REFERENCE TO RELATED APPLICATIONS

This application is a continuation application of U.S. patent application Ser. No. 17/862,477, filed Jul. 12, 2022, which is a continuation application of U.S. patent application Ser. No. 16/807,253, filed Mar. 3, 2020, now U.S. Pat. No. 11,394,694, which claims priority to U.S. Provisional Application No. 62/813,271, filed Mar. 4, 2019, both of which are incorporated herein by reference in their entireties.

TECHNICAL FIELD

The technology described herein relates generally to computer networking and more particularly to obscuring an association between source and destination devices.

BACKGROUND

On-demand networks can become strongly correlated with a specific or limited set of network addresses. This correlation or association may have undesirable results. For example, third parties may deny certain source network addresses from reaching certain destination addresses. This denial can be achieved via a black list or other denial tactics. This problem can exist for any clandestine network, regardless of whether the purpose of the clandestine network is for personal privacy or to conduct corporate or national operations.

SUMMARY

A system for obscuring a source IP address of a source network device from a destination network device is provided. The system comprises a proxy manager configured to provide, to the source network device, credentials for a plurality of disposable network proxies. The proxy manager generates, for each disposable network proxy in the plurality of disposable network proxies, a proxy disposal trigger based on a usage of the disposable network proxy. The system further comprises first and second disposable network proxies in the plurality of disposable network proxies. The first and second disposable network proxies receive, from the source network device, a connection request comprising the credentials and a destination IP address of the destination network device. The first and second disposable network proxies forward, over a first connection with the destination network device that uses an IP address of the disposable network proxy, first traffic from the source network device to the destination network device. The first and second disposable network proxies forward, over a second network connection with the source network device, second traffic from the destination network device to the source network device. The first and second disposable network proxies are used by the source network device to forward first and second traffic at separate times. The source network device discontinues use of the first and second disposable network proxies based on the proxy disposal trigger.

A method for obscuring a source IP address of a source network device from a destination network device is presented. In the method, a proxy manager provides credentials for a plurality of disposable network proxies to the source network device. The proxy manager generates a proxy disposal trigger based on a usage of the disposable network proxy for each disposable network proxy in the plurality of disposable network proxies. First and second disposable network proxies in the plurality of disposable network proxies receive a connection request comprising the credentials and a destination IP address of the destination network device from the source network device. The first and second disposable network proxies forward first traffic from the source network device to the destination network device over a first connection with the destination network device that uses an IP address of the disposable network proxy. The first and second disposable network proxies forward second traffic from the destination network device to the source network device over a second network connection with the source network device. The first and second disposable network proxies are used by the source network device to forward first and second traffic at separate times. The source network device discontinues use of the first and second disposable network proxies based on the proxy disposal trigger.

A non-transitory computer-readable medium encoded with instructions for commanding one or more data processors to execute steps of a method for obscuring a source IP address of a source network device from a destination network device is presented. In the method, a proxy manager provides credentials for a plurality of disposable network proxies to the source network device. The proxy manager generates a proxy disposal trigger based on a usage of the disposable network proxy for each disposable network proxy in the plurality of disposable network proxies. First and second disposable network proxies in the plurality of disposable network proxies receive a connection request comprising the credentials and a destination IP address of the destination network device from the source network device. The first and second disposable network proxies forward first traffic from the source network device to the destination network device over a first connection with the destination network device that uses an IP address of the disposable network proxy. The first and second disposable network proxies forward second traffic from the destination network device to the source network device over a second network connection with the source network device. The first and second disposable network proxies are used by the source network device to forward first and second traffic at separate times. The source network device discontinues use of the first and second disposable network proxies based on the proxy disposal trigger.

DETAILED DESCRIPTION

To mitigate the problem of correlation of on-demand networks with network addresses, systems and methods are provided for managing connections from a source network device to a destination network device through an automatically and continuously rotating pool of disposable micro-webservices that coordinate proxied network connections. The systems and methods are capable of configuring, commanding, communicating, and operating a composition of network devices from a single source network device without directly revealing: the network address of the source network device, that the destination network devices have a common source network device, and evidence of a relationship between the source network device and the destination network devices. The system can be configured to provide unsourced protection for any network protocol, provide fully encrypted proxy tunnels, be fully operated and customized by the source network device, host network proxies on any web-based environment, and automatically reclaim proxies based on use and/or time constraints.

Figure 1:
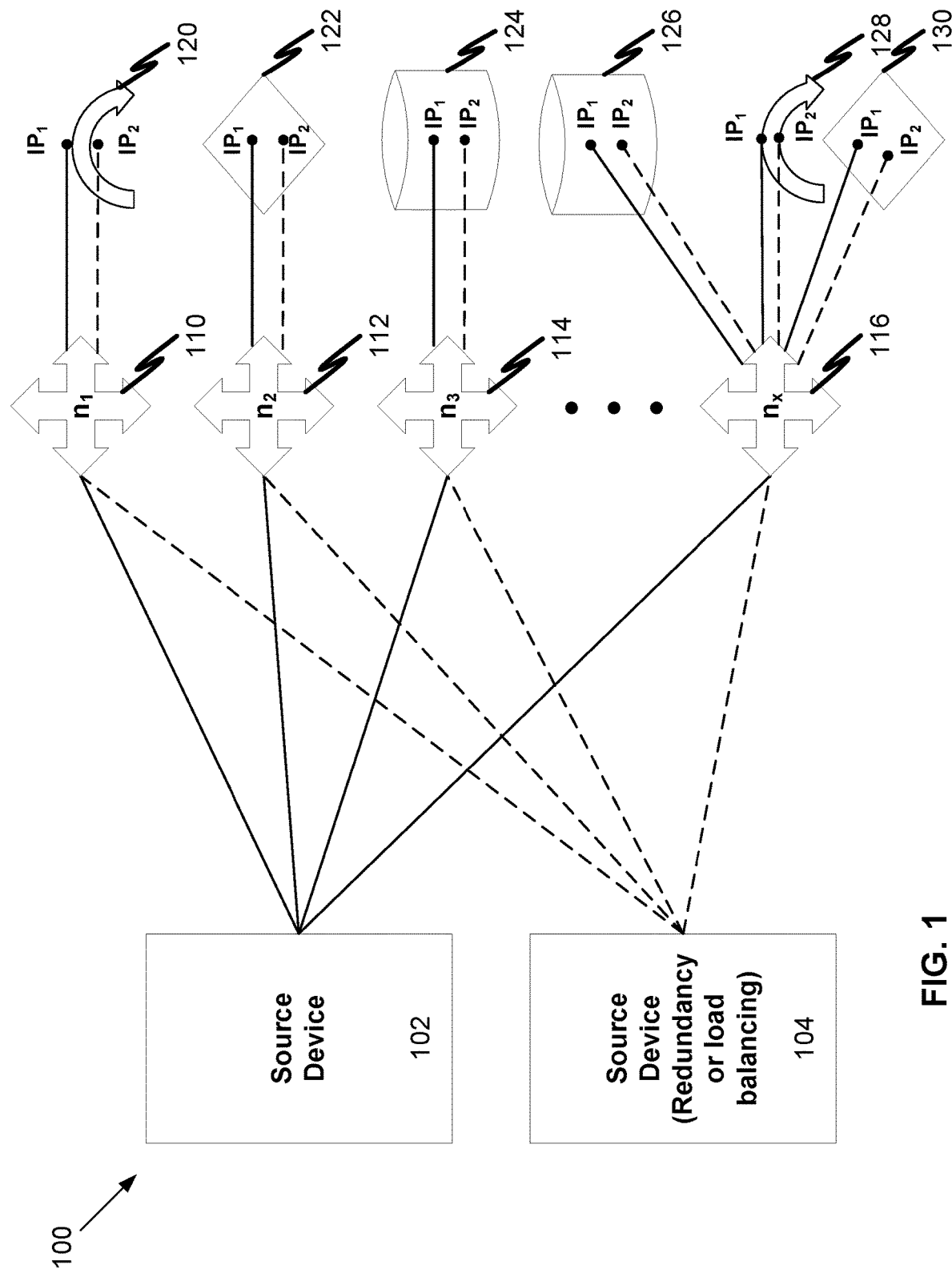
FIG. 1 is a diagram that depicts a direct source system.

FIG. 1 is a diagram that depicts a direct source system 100. The direct source system 100 comprises source network devices 102 and 104, network routing elements 110, 112, 114, and 116, destination network components that include services 120 and 128, virtual/physical devices 124 and 126, and client devices 122 and 130. A network routing element can connect to a number of destination network components. Both source devices 102 and 104 connect through network routing element 110 to the service 120, through network routing element 112 to the client device 122, through network routing element 114 to the virtual/physical device 124, and through network routing element 116 to the virtual/physical device 126, the service 128, and the client device 130. Each of the destination network components is aware of each of the network addresses of the source network devices 102 and 104, i.e., $IP_1$ and $IP_2$, respectively.

There can be various repercussions of a direct source system, such as the direct source system 100. For example, the destination network components 120, 122, 124, 126, 128, and 130 can be associated with each other because of their source relationship with sources $IP_1$ and $IP_2$. As another example, the destination network components 120, 122, 124, 126, 128, and 130 can be excluded from sources $IP_1$ and $IP_2$ via third party intervention using, e.g., black list or other denial tactics. As yet another example, the destination network components 120, 122, 124, 126, 128, and 130 are aware of and may have no ability to deny knowledge of source network addresses $IP_1$ and $IP_2$. Finally, source network addresses $IP_1$ and $IP_2$ may have no identity concealment against the destination network components 120, 122, 124, 126, 128, and 130.

Figure 2:
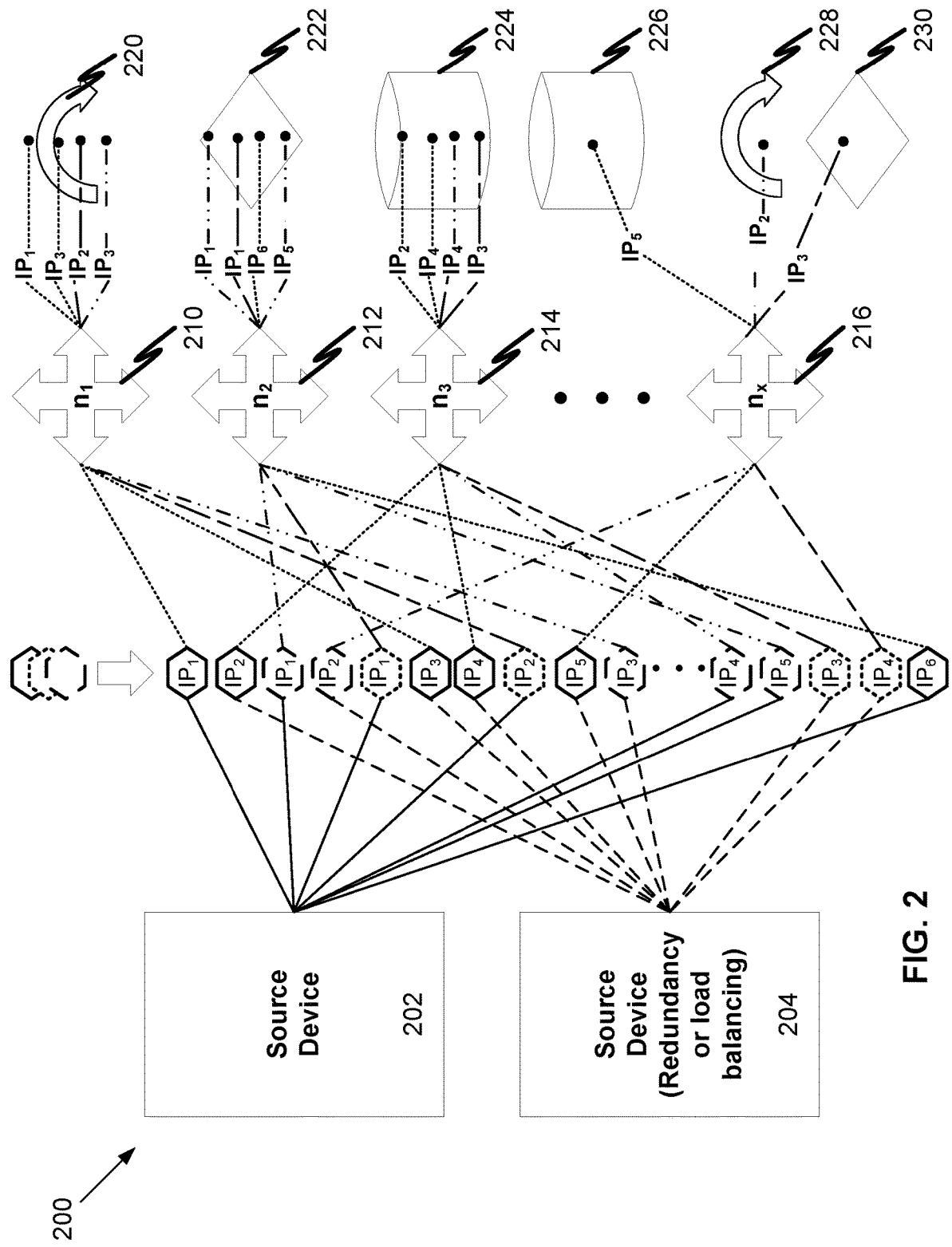
FIG. 2 is a diagram that depicts an unsourced system with disposable proxies.

FIG. 2 is a diagram that depicts an unsourced system 200. The unsourced system 200 comprises source network devices 202 and 204, a pool of network proxies, network routing elements 210, 212, 214, and 216, destination network components that include services 220 and 228, virtual/physical devices 224 and 226, and client devices 222 and 230. Instead of connecting directly through the network routing elements 210, 212, 214, and 216 to the destination network components, the source network devices 202 and 204 connect to the pool of network proxies, which is indicated by the vertical line of hexagons.

The downward arrow in the diagram indicates that over time, new network proxies are provided and are available for use. When a network proxy expires due to a proxy disposal trigger comprising a time or a use constraint, it may be recycled into the pool of network proxies to be reused at a later time. Alternatively, the network proxy may be disposed when it expires. Consecutive proxies may have different network addresses, such that a source network device can connect to a destination network device using multiple consecutive network proxies, and thus, multiple network addresses.

A time constraint can require the proxy manager not to provide the source network device any proxies that have been in operation for more than a specified period of time. A use constraint can require the proxy manager not to provide the source network device any proxies that have been used more than a specified number of times. The number of times that a proxy has been used is determined by a number of reserve/release cycles that proxy has undergone. The time and use constraints can ensure the proxies are essentially ephemeral, decreasing the chances of creating a relationship between the source network device and destination network devices. When a disposable proxy meets a threshold established by a time and/or use constraint, the disposable proxy is removed from the system and a new disposable proxy is generated by the system.

In the system 200, the proxies can be generated by network service providers. The outline of each of the hexagons indicates that the proxies were generated by a particular service provider. For example, in the system 200, a solid line indicates that the proxies were generated by a first service provider, a small dotted line indicates that the proxies were generated by a second service provider, and a large dotted line indicates that the proxies were generated by a third service provider.

Each time the source network device 202 or the source network device 204 perform a network call, the source network device can use a different proxy in the pool of proxies. For example, the source device 202 can use the network proxy outlined with a solid line and labeled $IP_1$ at first point in time and a network proxy outlined with a small dotted line and labeled $IP_2$ at a second point in time to connect to a first network element 210. The source device 204 can use the network proxy outlined with a solid line and labeled $IP_3$ at first point in time and a network proxy outlined with a large dotted line and labeled $IP_3$ at a second point in time to connect to the first network element 210.

In the unsourced system 200, the destination network components 220, 222, 224, 226, 228, and 230 are aware of the network addresses of the network proxies to which they were connected. For example, the destination network component 220 is aware of the network addresses of the two network proxies through which the source network device 202 was connected and the network addresses of the two network proxies through which the source network device 204 was connected. The destination network component 220 is not aware of the IP address of source devices 202 and 204.

Figure 3:
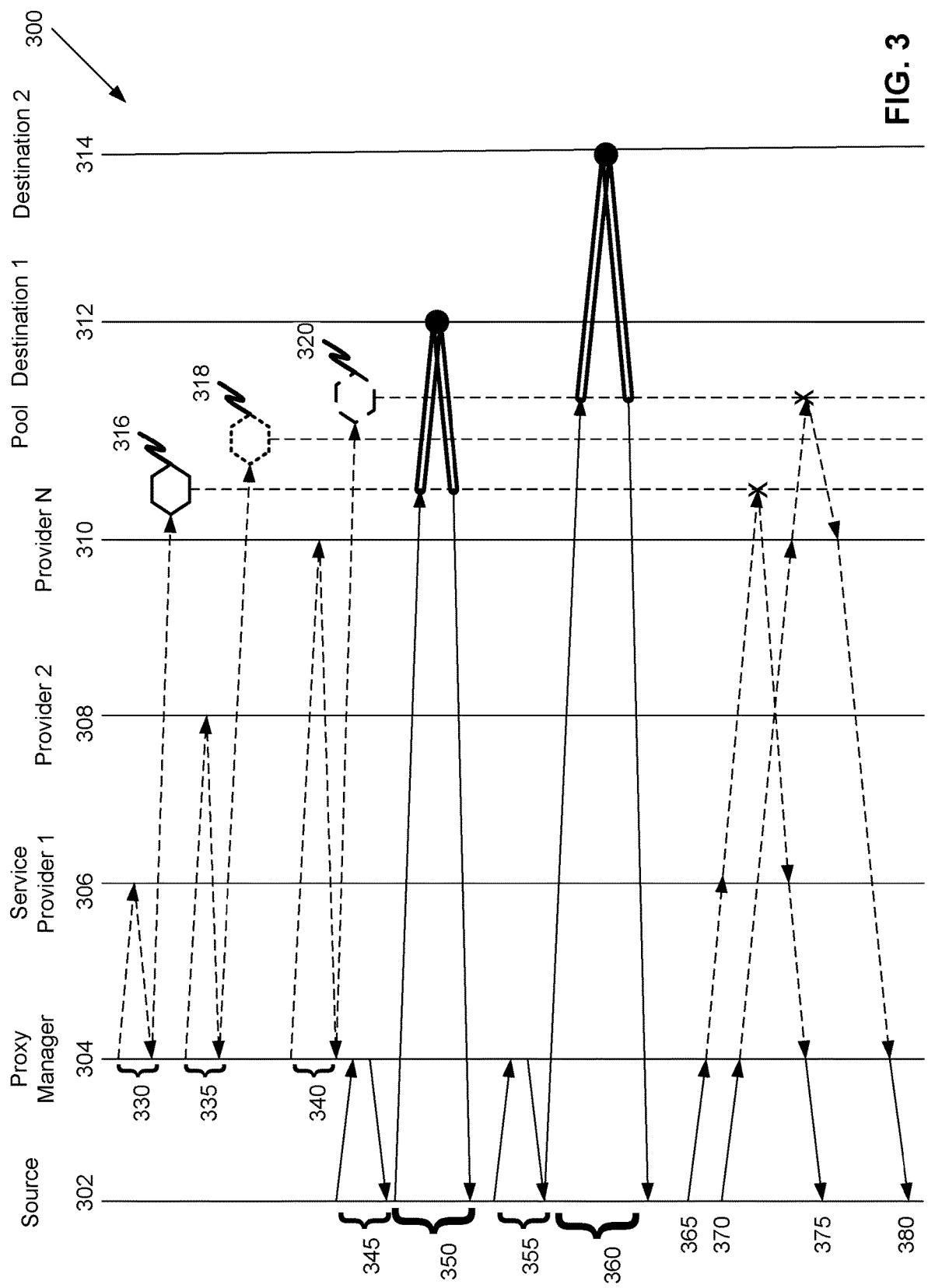
FIG. 3 is a diagram that depicts operations in an unsourced system with disposable proxies.

FIG. 3 is a diagram that depicts operations in an unsourced system 300. The unsourced system 300 comprises a source network device 302, a proxy manager 304, a first service provider 306, a second service provider 308, a third service provider 310, and destination network devices 312 and 314.

The proxy manager 304 communicates with the service providers 306, 308, and 310 at 330, 335, and 340. The proxy manager 304 requests a number of disposable proxies from each of the service providers 306, 308, and 310. These requests can be based on pool requirements given by the source device 302. When the first service provider 306 generates a network proxy 316, the first service provider 306 returns information identifying the network proxy 316, e.g., a unique resource locator (URL), to the proxy manager 304. The proxy manager 304 then places the network proxy 316 into the pool of network proxies. This process is repeated for the second service provider 308, which generates a network proxy 318, and the Nth service provider, which generates a network proxy 320. The network proxies 316, 318, and 320 are placed into the pool of network proxies by the proxy manager 304.

At 345, the source network device 302 requests a first network proxy, and the proxy manager returns information identifying the network proxy 316, e.g., a URL. At 350, the source network device 302 connects to the first destination network component 312 through network proxy 316. At 355, the source network device 302 requests a second network proxy, and the proxy manager returns information identifying the network proxy 320, e.g., a URL. At 360, the source network device 302 connects to the second destination network component 312 through network proxy 320.

At 365, the source network device 302 can release the network proxy 316, effectively terminating the connections with the network proxy 316, signaling to the proxy manager 304 that the network proxy 316 has gone through an operational use. Based on this information, the proxy manager 304 can keep track of time and use information for the network proxy 316 and determine if the time and/or use constraint has been met for the network proxy 316 based on the time and use information for the network proxy 316. If the time and/or use constraint has been met, the proxy manager can communicate with the first service provider 306 to terminate the connection to remove the network proxy 316 from the pool, e.g., generate a proxy disposal trigger. At 375, the removal of the network proxy 316 from the pool is communicated to the first service provider 306, to the proxy manager 304, and to the source network device 302.

At 370, the source network device 302 can release the network proxy 320, effectively terminating the connection with the network proxy 320, signaling to the proxy manager 304 that the network proxy 320 has gone through an operational use. Based on this information, the proxy manager 304 can keep track of time and use information for the network proxy 320 and determine if the time and/or use constraint has been met for the network proxy 320 based on the time and use information for the network proxy 320. If the time and/or use constraint has been met, the proxy manager can communicate with the Nth service provider 310 to terminate the connection to remove the network proxy 320 from the pool, e.g., generate a proxy disposal trigger. At 380, the removal of the network proxy 320 from the pool is communicated to the Nth service provider 310, to the proxy manager 304, and to the source network device 302.

Figure 4:
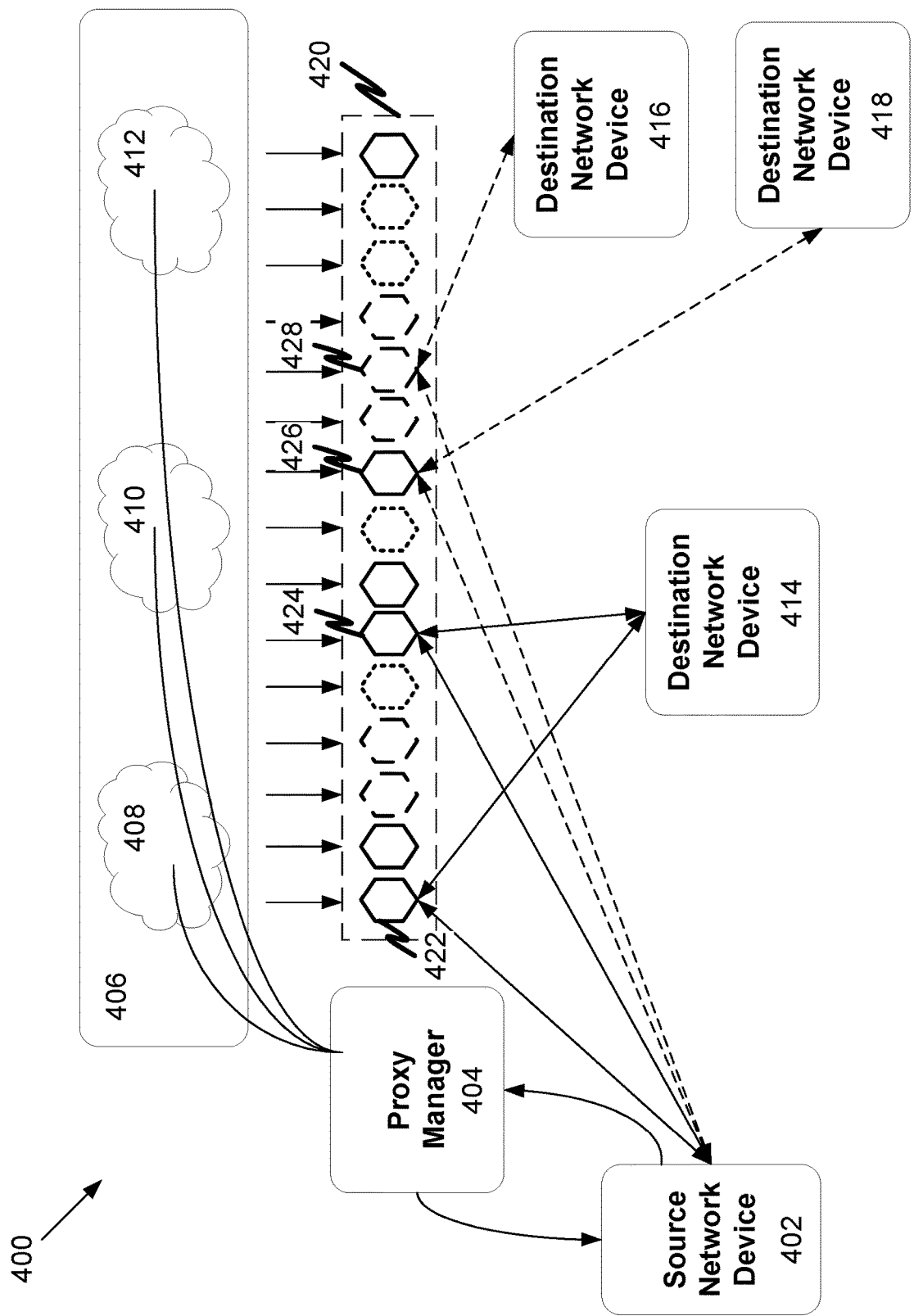
FIG. 4 is a diagram that depicts an unsourced system with disposable proxies that allows communication between a source network device and destination network devices.

FIG. 4 is a diagram that depicts an unsourced system 400 that allows communication between a source network device and destination network devices. The system 400 comprises a source network device 402, a proxy manager 404, a micro-services webhosting platform 406 comprising hardware virtualization 408, software virtualization 410, and application virtualization 412, destination network devices 414, 416, and 418, and a pool of network proxies 420.

An application on the source device 402 uses the proxy manager API to specify the pool requirements to the proxy manager 404 and to request a network proxy or release a network proxy from the proxy manager 404. A software process in the proxy manager 404 requests network proxies from the micro-services webhosting platform 406 on behalf of the source device 402 and brokers proxies to the source device 402. The micro-services webhosting platform 406 generates and supplies network proxies.

The micro-services webhosting platform 406 can be a private or a public web-hosting platform that provides platform as a service (PaaS) and infrastructure as a service (IaaS) providers, containers platforms, and serverless compute services. The micro-services webhosting platform 406 can take the form of a system that can implement an HTTP server, e.g., AWS EC2, Docker, or Cloud Foundry.

The source network device 402 requests one or more proxies 422, 424, 426, and 428 from the proxy manager 404. The proxy manager 404 returns information identifying the one or more network proxies 422, 424, 426, and 428 to the source network device 402. The source network device 402 connects to the one or more network proxies 422, 424, 426, and 428. For example, the source network device 402 connects to the network proxy 422 to connect to the destination network device 414 at a first time. At a second time, the source network device 402 connects to the network proxy 424 to connect to the destination network device 414. As another example, the source network device 402 connects to the network proxy 426 to connect to the destination network device 418. As a third example, the source network device 402 connects to the network proxy 428 to connect to the destination network device 416. The source network device 402 may use a different network proxy each time it connects to one of the destination network devices 414, 416, or 418.

The systems 200, 300, and 400 allow a source network device to proxy TCP network connections through a micro-webservice. Each network call from the source network device can be conducted through a micro-webservice in a continuously rotating pool of micro-webservices. Consecutive network calls can rotate through the rotating pool using different micro-webservices. Micro-webservices can be dismissed from the pool via time-based and/or use-based constraints. The system further allows the source network device to proxy TCP network connections over fully encrypted tunnels, as well as TCP network connections over the commonly available 443 port, regardless of the destination port.

The systems 200, 300, and 400 improve upon network proxies by establishing the concept of using disposable network proxies based on time and/or use constraints. The systems 200, 300, and 400 can generate and manage an unbounded number of disposable network proxies, reduce network footprints by automatically and continuously rotating proxies, conduct proxying activities over any web hosting environment, and provide encrypted tunnels for a number of network protocols.

Figure 5:
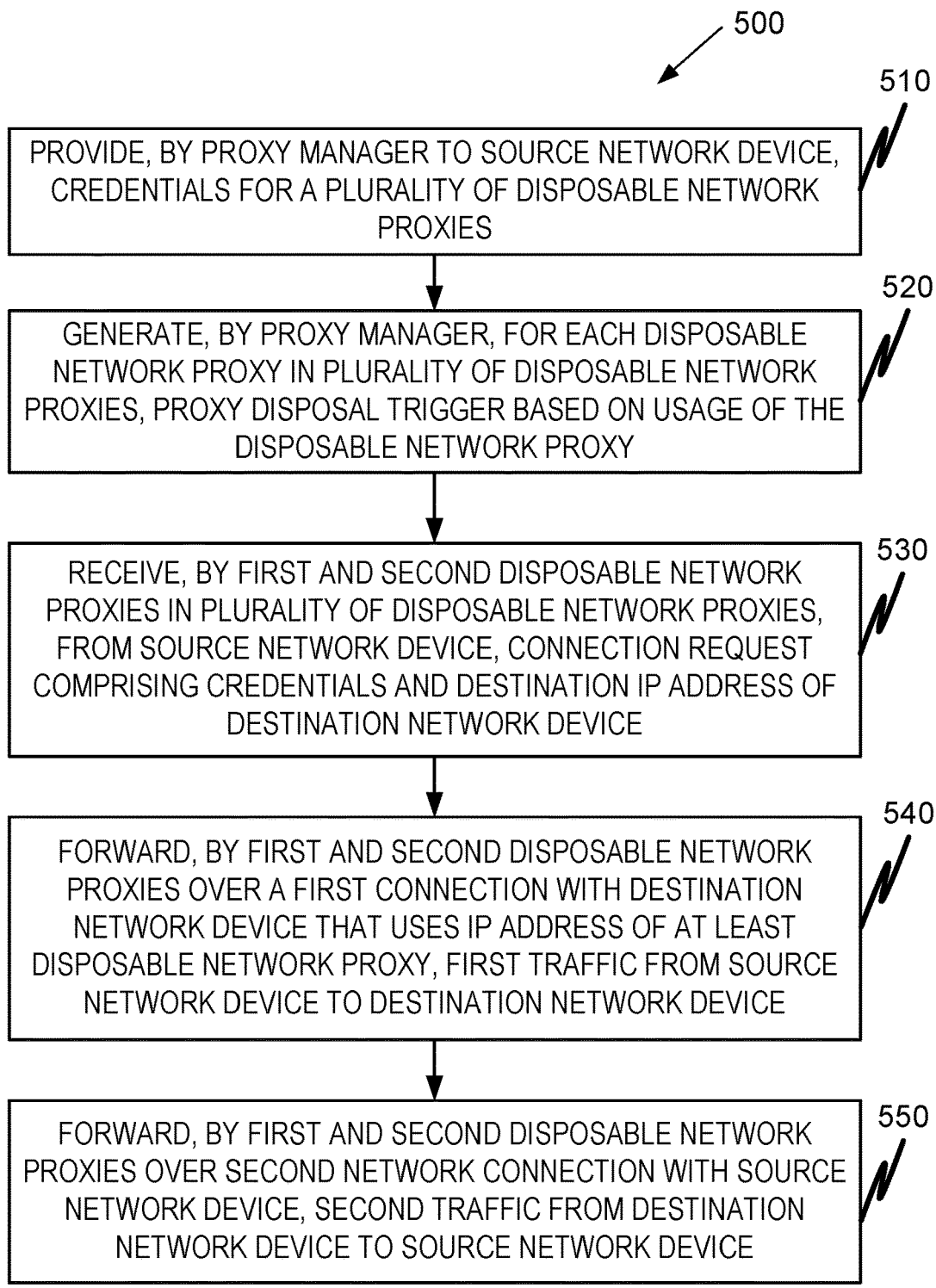
FIG. 5 depicts a method for obscuring a source IP address of a source network device from a destination network device.

FIG. 5 is a flow diagram 500 depicting a method for obscuring a source IP address of a source network device from a destination network device. At 510, a proxy manager provides credentials for a plurality of disposable network proxies to the source network device. The proxy manager generates a proxy disposal trigger based on a usage of the disposable network proxy for each disposable network proxy in the plurality of disposable network proxies at 520. At 530, first and second disposable network proxies in the plurality of disposable network proxies receive a connection request comprising the credentials and a destination IP address of the destination network device from the source network device. The first and second disposable network proxies forward first traffic from the source network device to the destination network device over a first connection with the destination network device that uses an IP address of the disposable network proxy at 540. At 550, the first and second disposable network proxies forward second traffic from the destination network device to the source network device over a second network connection with the source network device. The first and second disposable network proxies are used by the source network device to forward first and second traffic at separate times. The source network device discontinues use of the first and second disposable network proxies based on the proxy disposal trigger.

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A system for obscuring a source IP address of a source network device from at least one destination network device, the system comprising:
   a proxy manager configured to:
      provide, to the source network device, credentials for a pool of disposable network proxies and a proxy disposal trigger for each disposable network proxy; and
   first and second disposable network proxies in the pool of disposable network proxies, configured to:
      forward, over a first network connection with the at least one destination network device that uses an IP address of the first disposable network proxy, first traffic from the source network device to the at least one destination network device; and
      forward, over a second network connection with the source network device that uses an IP address of the second disposable network proxy, second traffic from the at least one destination network device to the source network device; and
   wherein the source network device is configured to discontinue use of the first or second disposable network proxy based on at least one proxy disposal trigger comprising a time or a use constraint.

2. The system of claim 1, wherein the proxy manager is further configured to:
   receive, from the source network device, proxy pool requirements, the proxy pool requirements indicating a number of disposable network proxies; and
   send, to at least one network service provider, a request for the pool of disposable network proxies based on the proxy pool requirements.

3. The system of claim 1, wherein the credentials comprise a unique uniform resource locator (URL).

4. The system of claim 1, wherein the time constraint indicates a time measured in minutes or seconds that the disposable network proxy is used.

5. The system of claim 1, wherein the use constraint indicates a number of times that the disposable network proxy is recycled.

6. The system of claim 1, wherein the first and second network connections form an encrypted tunnel for communications between the source network device and the at least one destination network device.

7. The system of claim 1, wherein the first and second disposable network proxies are further configured to:
   terminate the first and second network connections based on a corresponding release request from the source network device.

8. The system of claim 1, further configured to allow the at least one destination network device to communicate with the source network device without any detectable, direct reveal of at least one of the following information: (1) the IP address of the source network device, (2) that a plurality of destination network devices have a common source network device, and (3) evidence of a relationship between the source network device and the at least one destination network device.

9. The system of claim 1, wherein at least two, redundant copies of a first traffic from at least one source network device are each forwarded by the first and second disposable network proxies to further mitigate correlation of the at least one destination network device and at least one source IP address.

10. The system of claim 1, wherein a first traffic is load balanced across at least two source network devices, each of which forward the first traffic to the first and second disposable network proxies to further mitigate correlation of the at least one destination network device and at least one source IP address.

11. A method for obscuring a source IP address of a source network device from at least one a destination network device, the method comprising:
   providing from a proxy manager to a source network device, credentials for a pool of disposable network proxies and a proxy disposal trigger for each disposable network proxy; and
   wherein the first and second disposable network proxies in the pool of disposable network proxies are configured to:
      forward, over a first network connection with the at least one destination network device that uses an IP address of the first disposable network proxy, first traffic from the source network device to the at least one destination network device; and forward, over a second network connection with the source network device that uses an IP address of the second disposable network proxy, second traffic from the at least one destination network device to the source network device; and wherein the source network device is configured to discontinue use of the first or second disposable network proxy based on at least one proxy disposal trigger comprising a time or a use constraint.

12. The method of claim 11, further comprising:

receiving, by the proxy manager from the source network device, proxy pool requirements, the proxy pool requirements indicating a number of disposable network proxies; and sending, by the proxy manager to at least one network service provider, a request for the pool of disposable network proxies based on the proxy pool requirements.

13. The method of claim 11, wherein the credentials comprise a unique uniform resource locator (URL).

14. The method of claim 11, wherein the time constraint indicates a time measured in minutes or seconds that the disposable network proxy is used.

15. The method of claim 11, wherein the use constraint indicates a number of times that the disposable network proxy is recycled.

16. The method of claim 11, wherein the first and second network connections form an encrypted tunnel for communications between the source network device and the at least one destination network device.

17. The method of claim 11, further comprising:

terminating, by the first and second disposable network proxies, the first and second network connections based on a corresponding release request from the source network device.

18. A system for obscuring a source IP address of a source network device from a plurality of destination network devices, the system comprising:

a proxy manager configured to:

provide, to the source network device, information identifying a plurality of disposable network proxies and a proxy disposal trigger for each disposable network proxy;

wherein the source network device connects to a first disposable network proxy of the plurality of disposable network proxies to connect to one of the plurality of destination network device at a first time;

wherein to connect to the one of the plurality of destination network devices at a second time, the source network device connects to a second disposable network proxy of the plurality of disposable network proxies; and wherein the source network device discontinues use of the first or second disposable network proxies based on at least one proxy disposal trigger.

19. A system for obscuring a source IP address of a source network device from at least one destination network device, the system comprising:

a proxy manager configured to:

provide, to the source network device, credentials for a pool of disposable network proxies and a proxy disposal trigger for each disposable network proxy; and first and second disposable network proxies in the pool of disposable network proxies, configured to:

forward, over a first network connection with the at least one destination network device that uses an IP address of the first disposable network proxy, first traffic from the source network device to the at least one destination network device; and forward, over a second network connection with the source network device that uses an IP address of the second disposable network proxy, second traffic from the at least one destination network device to the source network device;

wherein the first network connection and the second network connection are concurrent; and wherein the source network device is configured to discontinue use of the first or second disposable network proxy based on at least one proxy disposal trigger comprising a time or a use constraint.

20. A system for obscuring a source IP address of a source network device from a plurality of destination network devices, the system comprising:

a proxy manager configured to:

provide, to the source network device, information identifying a plurality of disposable network proxies and a proxy disposal trigger for each disposable network proxy;

wherein the source network device connects to a first disposable network proxy of the plurality of disposable network proxies to connect to one of the plurality of destination network device at a first time;

wherein to connect to the one of the plurality of destination network devices at a second time, the source network device connects to a second disposable network proxy of the plurality of disposable network proxies;

wherein the source network device discontinues use of the first or second disposable network proxies based on at least one proxy disposal trigger; and wherein the source network device discontinues use of the first or second disposable network proxies at least after the source network device has connected to the first disposable network proxy and to the second disposable network proxy.

\* \* \* \* \*